United States Patent [19]

Ishida

[11] Patent Number: 5,381,689
[45] Date of Patent: Jan. 17, 1995

[54] MISFIRE DETECTING SYSTEM FOR INTERNAL COMBUSTION ENGINE

[75] Inventor: Yasuhiko Ishida, Hyogo, Japan

[73] Assignee: Mitsubishi Denki Kabushiki Kaisha, Tokyo, Japan

[21] Appl. No.: 69,610

[22] Filed: Jun. 1, 1993

[30] Foreign Application Priority Data

Jun. 2, 1992 [JP] Japan ................................ 4-141244

[51] Int. Cl.$^6$ .......................................... G01M 15/00
[52] U.S. Cl. .................................................. 73/116
[58] Field of Search ...................... 73/116, 117.3; 364/431.07, 431.08; 123/419, 436

[56] References Cited

U.S. PATENT DOCUMENTS 3,972,230 8/1976 Hanson et al. ..................... 73/116
4,302,814 11/1981 Full et al. ......................... 73/116

FOREIGN PATENT DOCUMENTS

4131383 3/1992 Germany .
62-26345 2/1987 Japan .

*Primary Examiner*—Robert Raevis
*Attorney, Agent, or Firm*—Sughrue, Mion, Zinn, Macpeak & Seas

[57] ABSTRACT

In a misfire detecting system for an internal combustion engine, the ratio of periods of time is detected which correspond to predetermined angular intervals which are provided before and after a particular reference angle of a reference period signal providing a crank angle position corresponding to the timing of ignition of the internal combustion engine; the acceleration of the time ratio is obtained, to determine it from the acceleration or time ratio whether or not a misfire has occurred; and the resolution of detecting the time corresponding to the predetermined angular intervals is changed according to the number of revolutions per minute of the engine.

4 Claims, 7 Drawing Sheets

MISFIRE DETECTING SYSTEM FOR INTERNAL COMBUSTION ENGINE

BACKGROUND OF THE INVENTION

1. Field of the Invention

This invention relates to misfire detecting systems for internal combustion engines, and more particularly to a misfire detecting system for an internal combustion engine which detects the occurrence of misfires caused by abnormal conditions in the ignition system or fuel system of the internal combustion engine.

2. Discussion of the Related Art

A misfire detecting system of this type has been disclosed, for instance, by Japanese Patent Application (OPI) No. 26345/1987 (the term "OPI" as used herein means an "unexamined published application"). The system operates as follows: The pressure in a cylinder (hereinafter referred to as "a cylinder pressure", when applicable) of the engine is detected with a cylinder pressure sensor, and a crank angle is obtained when the cylinder pressure shows a peak value. And when this peak position is in a predetermined range of crank angles, it is determined that the cylinder is in normal state.

In the case of the above-described conventional misfire detecting system, in order to detect the peak position of the cylinder pressure, it is necessary to measure the cylinder pressure continuously every predetermined crank angle or every predetermined period of time. Hence, the system is disadvantageous in that it is unavoidably intricate in arrangement. On the other hand, when the engine is operated under light load, the cylinder pressure shows two peak values; one being provided at the top dead center in the stroke of compression, and the other due to combustion, which makes it difficult to detect the occurrence of a misfire. In the case where the peak value appears before the top dead center in the stroke of compression, it is impossible to determine the occurrence of a misfire.

SUMMARY OF THE INVENTION

Accordingly, an object of this invention is to eliminate the above-described difficulties accompanying a conventional misfire detecting system for internal combustion engines.

More specifically, an object of the invention is to provide a misfire detecting system for an internal combustion engine which is relatively simple in arrangement and is able to determine the occurrence of a misfire accurately in a wide range of operation of the engine.

The foregoing object and other objects of the invention have been achieved by the provision of a misfire detecting system for an internal combustion engine, which, according to the invention, comprises: time ratio detecting means for detecting the ratio of periods of time corresponding to predetermined angular intervals which are provided before and after a particular reference angle of a reference period signal providing a crank angle position corresponding to the timing of ignition of the internal combustion engine; misfire deciding means for obtaining the acceleration of said time ratio, to determine from the acceleration or time ratio whether or not a misfire has occurred; and means for changing the resolution of detecting the time corresponding to the predetermined angular intervals, according to the number of revolutions per minute of the engine.

In the misfire detecting system, the time ratio detected depends on the presence or absence of a misfire, and the occurrence of a misfire is determined from the difference between the time ratios or the acceleration of the latter, and the resolution of detecting the time corresponding to the angular intervals is changed according to the speed of the engine. Hence, both the misfire detecting speed and the misfire detecting accuracy are greatly increased.

The nature, principle, and utility of the invention will be more clearly understood from the following detailed description of the invention when read in conjunction with the accompanying drawings.

DETAILED DESCRIPTION OF THE PREFERRED EMBODIMENTS

Preferred embodiments of this invention will be described with reference to the accompanying drawings in detail.

Figure 1:
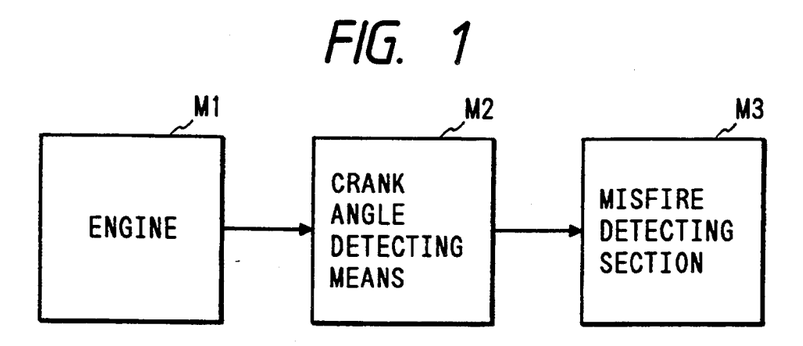
FIG. 1 is a block diagram showing the arrangement of a misfire detecting system for an internal combustion engine according to the invention.

A misfire detecting system for an internal combustion engine according to the invention is arranged as shown in FIG. 1.

In FIG. 1, reference character M1 designates the engine; M2, crank angle detecting means connected to the engine M1 to output a reference crank angle position for ignition control; and M3, misfire detecting section connected to the crank angle detecting means M2. The misfire detecting section M3 includes time ratio detecting means for detecting a time ratio, and misfire deciding means for deciding the occurrence of a misfire. The misfire detecting section M3 determines from the output signal of the crank angle detecting means M2 the ratio of times of a reference period signal which occur before and after a predetermined angle of the engine M1, for instance, the top dead center (hereinafter referred to as "a time ratio", When applicable), or determines the occurrence of a misfire from the acceleration of the time ratio.

Figure 2:
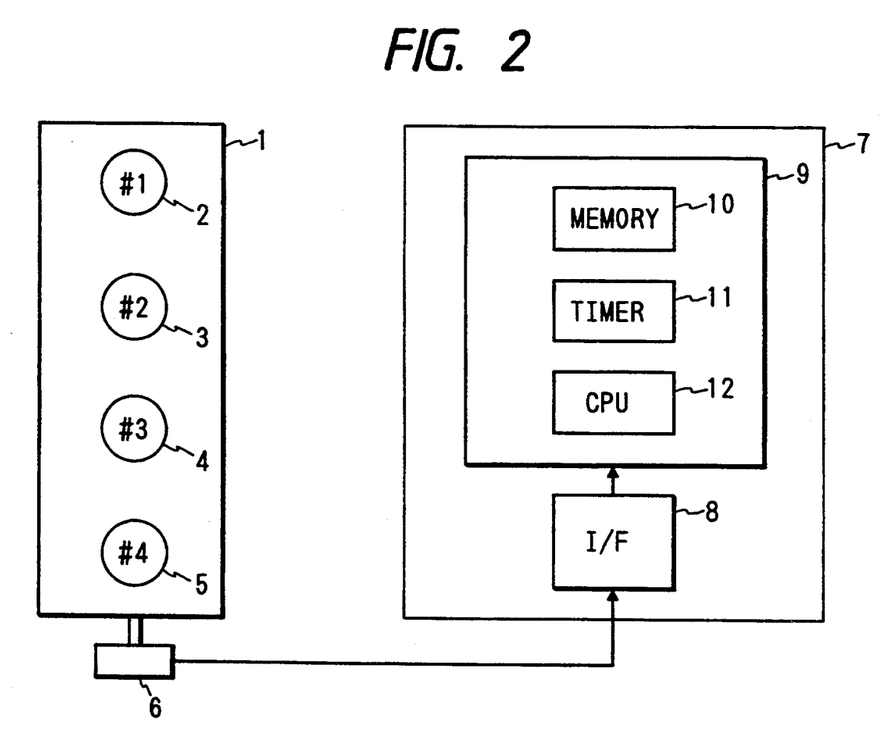
FIG. 2 is also a block diagram showing the arrangement of an example of the misfire detecting system shown in FIG. 1 in detail, which constitutes one embodiment of the invention.

A concrete example of the above-described misfire detecting system is as shown in FIG. 2, which constitutes one embodiment of the invention. In FIG. 2, reference numeral 1 designates an engine with #1, #2, #3 and #4 cylinders 2, 3, 4 and 5; 6, a crank angle sensor connected to the crank shaft or cam shaft of the engine 1, to output a period signal every crank angle reference position (for instance 180°) corresponding to the ignition position of each of the cylinders 2 through 5; and 7, a misfire detecting section which receives the output of the crank angle sensor 6 to detect a time ratio, and to detect the occurrence of a misfire from the time ratio thus detected. The misfire detecting section 7 comprises: an interface 8; and a microcomputer 9. The output signal of the crank angle sensor 6 is transmitted through the interface 8 to the microcomputer 9. The latter 9 includes: a memory 10 for storing operating procedures and control data; a timer counter (or free running counter) 11 which counts upward with a predetermined time clock pulse; and a CPU (central processing unit) 12 for performing arithmetic operations for detection of the occurrence of a misfire.

The output signal of the crank angle sensor 6 is applied through the interface 8 to the microcomputer 9, where it is subjected to arithmetic operation.

Now, the operation of the misfire detecting system thus organized will be described.

Figure 3A:
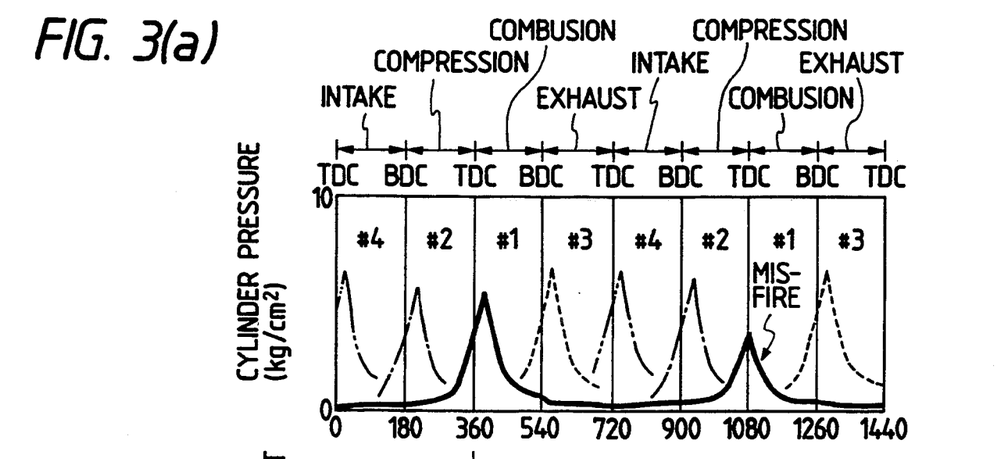
FIGS. 3(a) to 3(d) are time charts for a description of the operation of the misfire detecting system of the invention.
Figure 3B:
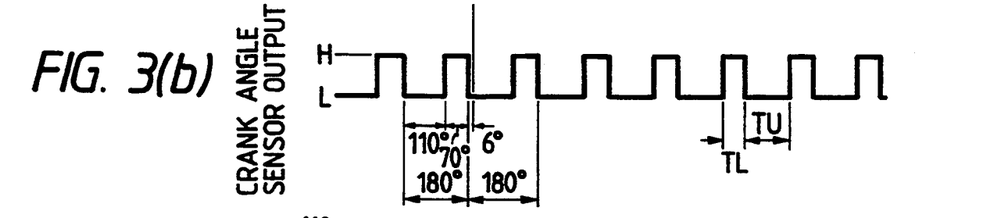

First, relationships between the crank angle sensor 6 and ignition and combustion will be described. FIGS. 3(a) and 3(b) show variations in pressure of the cylinders 2 through 5 with respect to the crank angles of the 4-strokecycle 4-cylinder engine, and waveforms thereof. In FIG. 3(a), the solid line indicates the waveform of the pressure in the #1 cylinder; the broken line, the waveform of the pressure in the #3 cylinder, the one-dot chain line, the waveform of the pressure in the #2 cylinder; and the two-dot chain line, the waveform of the pressure in the #4 cylinder. Further in FIG. 3(a), reference characters BDC and TDC designate the top dead center and the bottom dead center, respectively.

As shown in FIGS. 3(a) to 3(d), in the 4-cylinder engine, the cylinders have a phase difference of crank angle 180° in combustion cycle. For simplification in illustration, with respect to the waveforms of pressure of the #2, #3 and #4 cylinders, only the strokes of compression and combustion are shown.

As shown in FIG. 3(b), the crank angle sensor 6, in correspondence to the ignition timing of each of the cylinders 2 through 5, produces a periodic signal with a cycle of 180° with the position as a reference which is for instance 6° before the TDC, in such a manner that the periodic signal is divided into two parts; for instance, a low level interval of 110°, and a high lever interval of 70°. In general, in the ignition control, with reference to this periodic signal, the energization of the ignition coils (not shown) is controlled.

For instance, in the case of the #1 cylinder, energization of the ignition coil is started during the high level interval in the stroke of compression between crank angles 180° and 360°, and the ignition coil is deenergized with reference to the output signal of the crank angle sensor 6 which changes from high level to low level near at the TDC with the timing of ignition, to induce a high voltage. The high voltage thus induced is applied to the ignition plug for ignition. Thus, the pressure in the cylinder changes as indicated by the solid line in FIG. 3(a); that is, the ignition occurs in the stroke of explosion between crank angles 360° and 540°, so that the combustion pressure is increased. Thereafter, similarly the combustion occurs with the remaining cylinders cyclically with a period of 180°. That is, the combustion occurs with the #1 cylinder, #3 cylinder, #4 cylinder, #2 cylinders, and so forth in the stated order.

Now, a misfire detecting method of the invention will be described concretely.

Figure 3C:
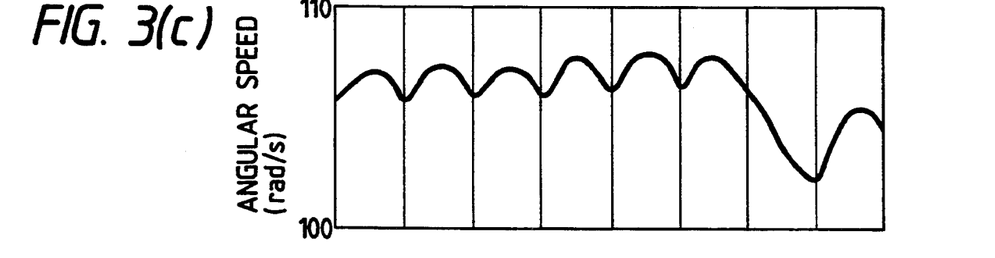

FIGS. 3(a) and 3(c) show combustion with angular speed. In the case of the figures, the speed of the engine is 1000 rpm. Of the waveform of the pressure in the #1 cylinder indicated by the solid line in FIG. 3(a), the part around a crank angle of 360° is for the case where combustion is normal. A mixed gas filled in the cylinder in the stroke of intake is compressed in the stroke of compression, and ignited substantially at the TDC in the stroke of compression, and abruptly expanded in the stroke of explosion, and then discharged out of the cylinder in the stroke of exhaust.

Now, a misfire will be described which occurs with the failure of ignition, or because of the improper mixing ratio of air and fuel.

The occurrence of a misfire of this type corresponds to the part of the waveform of pressure which is around a crank angle of 1080° and extended symmetrical with respect to the TDC. In this case, no combustion is attained at all; that is, a misfire occurs. However, if the misfire is not so serious, then the transition of pressure in the stroke of explosion is substantially half of that indicated by the normal waveform of pressure provided between crank angles 360° and 540°. On the other hand, as is seen from a range of from crank angles 0° to 1080° in FIG. 3(c), the angular speed is increased as the torque is increased with the stroke of explosion of each cylinder, and it is decreased with the stroke of compression.

When a misfire occurs, as is seen from a range of crank angles smaller than 1080°, the torque is not increased by explosion, and therefore the angular speed is decreased until explosion occurs with the next cylinder; i.e., the #3 cylinder. On the basis of this fact, this invention has been developed; that is, the invention is intended to determine from variations in angular speed of the crank angle in a predetermined interval whether or not a misfire has occurred.

Figure 4:
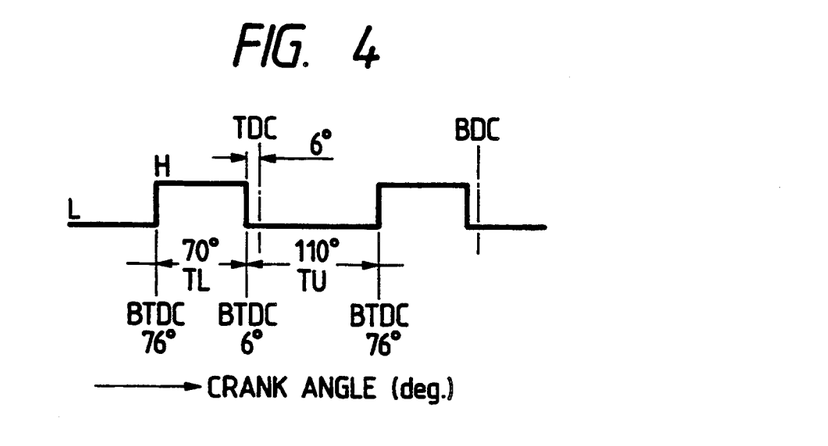
FIG. 4, and FIGS. 5 and 6 are a time chart and flow charts, respectively, for a description of the operation of a microcomputer in the misfire detecting system of the invention.
Figure 5:
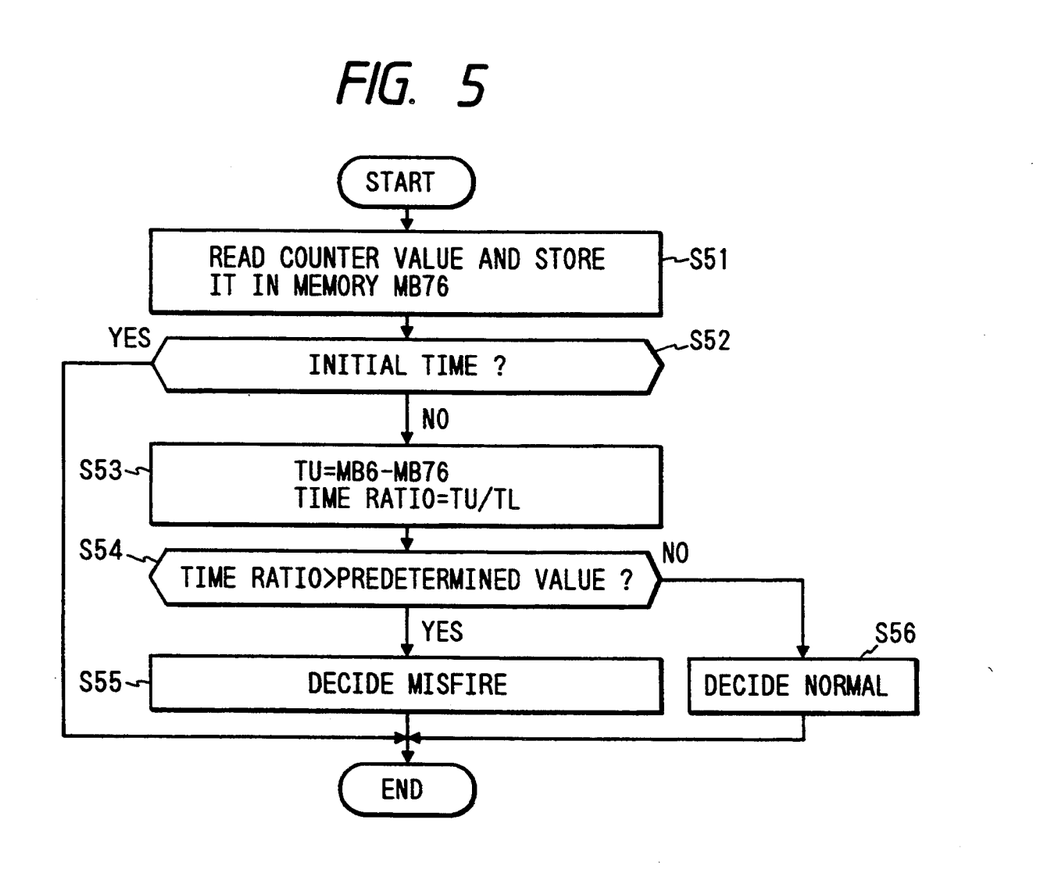
Figure 6:
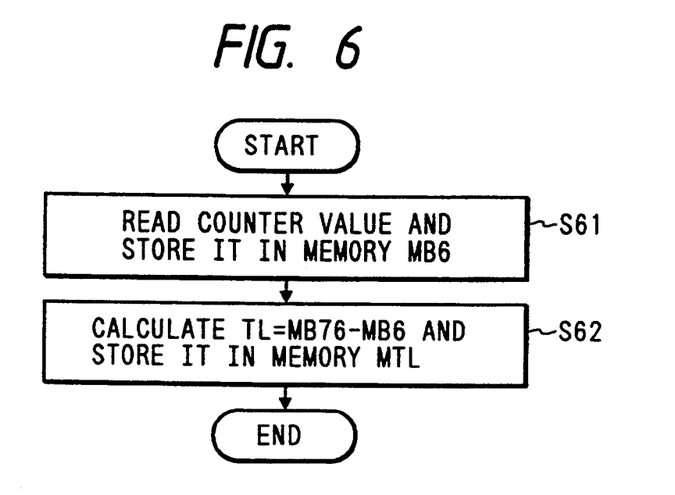

FIG. 4, and FIGS. 5 and 6 are a time chart, and flow charts, respectively, for a description of the arithmetic operations of the above-described microcomputer 9. In the embodiment, in FIG. 3(b), both a period of time corresponding to the high level interval TL of a crank angle 70°, which is 6° before the TDC, of the ignition period signal, and a period of time corresponding to the low level interval TU of a crank angle 110 covering the TDC are measured, and it is determined from the ratio of these periods of time whether or not a misfire has occurred.

The time chart of FIG. 4 is to describe arithmetic operations with respect to crank angles. Every 76° before the TDC (hereinafter referred to as "BTDC 76°", when applicable), in response to the output signal of the crank angle sensor 6 an interruption takes places in the microcomputer 9 through the interface 8, so that an interrupt processing routine is executed according to the flow chart of FIG. 5, and every 6° before the TDC (hereinafter referred to as "BTDC 6°", when applicable) operations are carried out according to the flow chart of FIG. 6.

In Step S51 of FIG. 5, the CPU 12 reads the count value of the timer 11 which counts upwards in response to a predetermined time clock pulse, and stores it in a memory MB 76 (not shown) in the memory means 10. The value thus stored is the time instant at BTDC 76°. Thereafter, in Step S52, it is determined with reference to a flag (not shown) whether or not the present processing operation is for the first time after the start of the program. The flag has been so set as to indicate that the present processing operation is for the first time after the start of the program. In this case, the flag is cleared, and since the result of determination is "Yes", the processing operation is ended.

Next, the CPU 12 is caused to wait until the output signal of the crank angle sensor 6 shows BTDC 6°. As the engine rotates, the BTDC 6° is reached as shown in FIG. 4, whereupon an interruption takes place again with the aid of the output signal of the crank angle sensor 6, so that the operations shown in the flow chart of FIG. 6 are carried out. That is, in Step 61 of FIG. 6, the count value of the timer 11 is read, so that the value representing the time corresponding to the BTDC 6° is stored in a memory MB 6 (not shown).

Next, in Step S62, with reference to the time corresponding to the BTDC 76° which has been stored in Step 51 of FIG. 5, a period of time corresponding to an interval TL shown in FIG. 4 is calculated from the following expression (1):

$$TL = MB76 - MB6 \quad (1)$$

The period of time thus calculated is stored in a memory MTL (not shown), and the processing operation is ended.

Thereafter, when the position of BTDC 76° corresponding to an ignition signal for the next cylinder is reached, the processing operations shown in FIG. 5 are carried out again. In Step S51, the contents of the memory MB 76 is renewed for the following operation, and Step S52 is effected. Since the initial flag has been cleared by the previous operation, Step S53 is effected. In Step S53, with reference to the time corresponding to the BTDC 6° which has been obtained in Step S61 of FIG. 6, a period of time corresponding to an interval TU shown in FIG. 4 is calculated from the following expression (2):

$$TU = MB6 - MB76 \quad (2)$$

And the time ratio is calculated from the following expression (3):

$$\text{Time ratio} = TU/TL \quad (3)$$

Thereafter, in Step S54, it is determined whether or not the time ratio thus calculated is larger than a predetermined value for determination of the occurrence of a misfire. When it is larger, Step S55 is effected to determine that a misfire has occurred. When it is smaller, then Step S56 is effected to determine that the engine is in normal state. Then, the processing operation is ended.

Similarly, with the BTDC 76°, the operations shown in the flow chart of FIG. 5 are carried out; and with the BTDC 6°, the operations shown in the flow chart of FIG. 6 are performed, so that the time ratios of the cylinders are calculated successively.

Figure 3D:
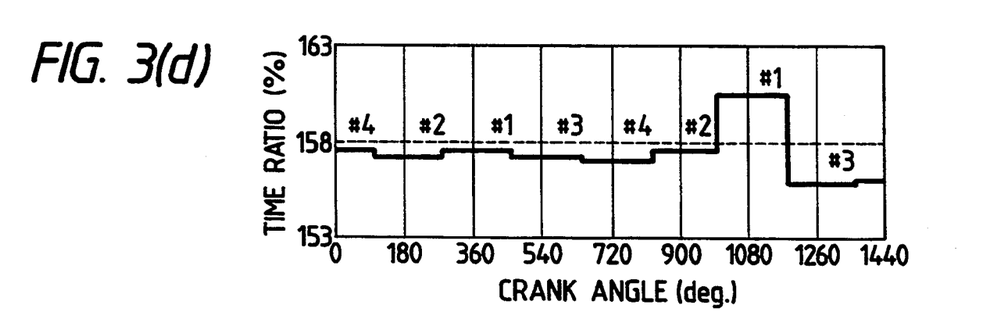

FIG. 3(d) indicates relationships between the occurrence of misfires and the time ratios (TU/TL (%)). In FIG. 3(d), the solid line indicates the time ratios calculated for the #1 through #4 cylinders. The value "158%" indicated by the broken line in FIG. 3(d) may be employed as the predetermined value for determination of the occurrence of a misfire in Step S54 in FIG. 5. In this case, the time ratio TU/TL is increased in correspondence to the occurrence of a misfire in the #1 cylinder around a crank angle 1080°, thus becoming larger than the predetermined value. Hence, the occurrence of a misfire can be determined.

In the above-described embodiment, the ignition controlling crank angle sensor is employed, and therefore it is unnecessary to additionally provide a sensor for determination of the occurrence of a misfire. In addition, since the time ratio is obtained by dividing with the time in the stroke of compression, the variation in load of the engine can be normalized.

Now, a method of determining the occurrence of a misfire from the acceleration of the time ratio will be described with reference to FIGS. 6 through 9.

Figure 7:
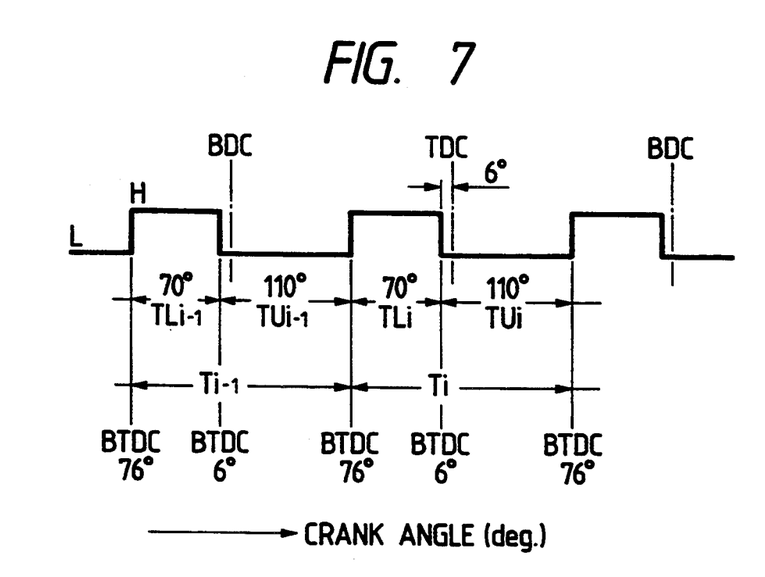
FIG. 7 is a time chart for a description of the arithmetic operation with respect to crank angles in the misfire detecting system of the invention.
Figure 8:
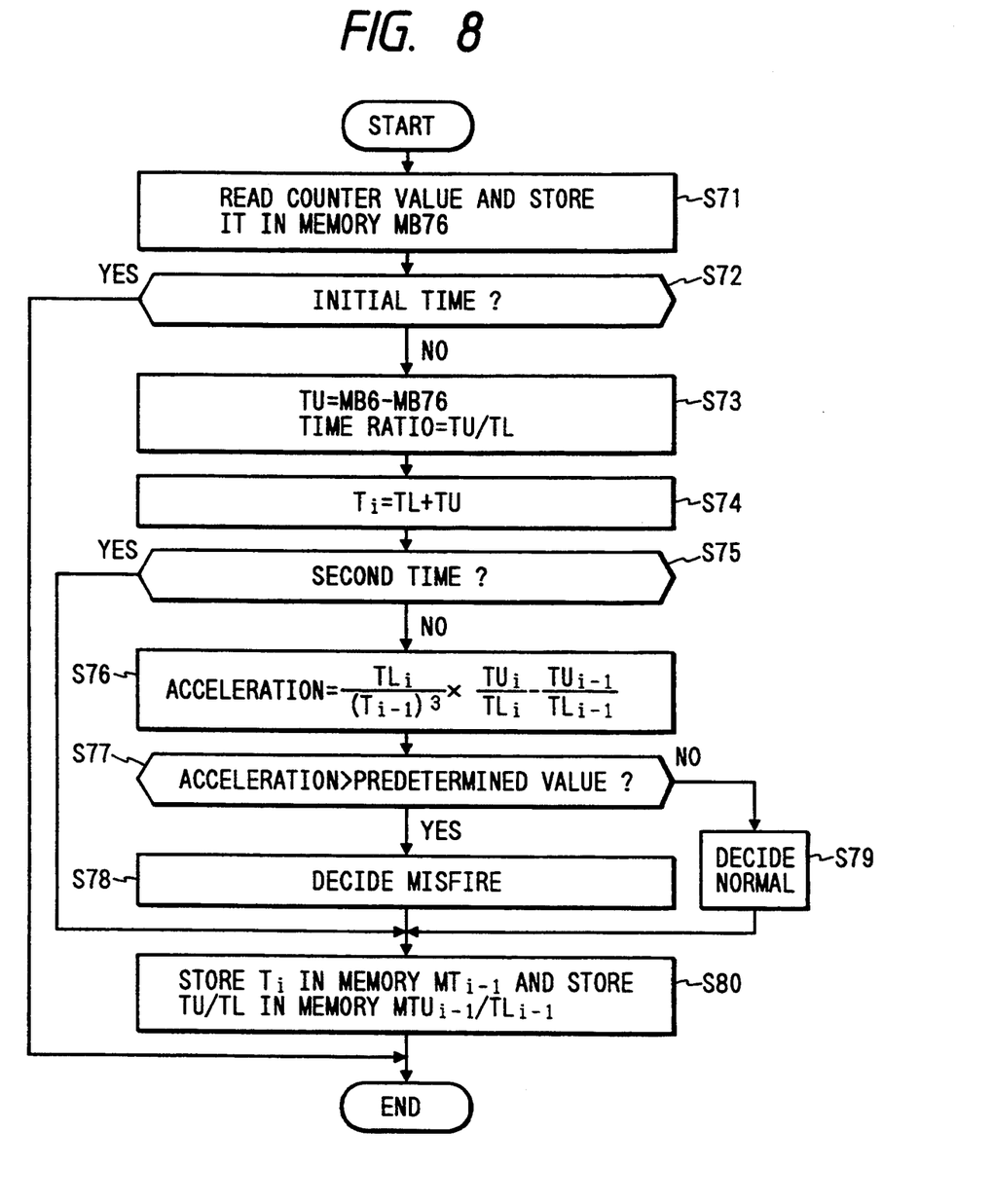
FIG. 8 is a flow chart for a description of the operation of the microcomputer in the misfire detecting system of the invention.
Figure 9A:
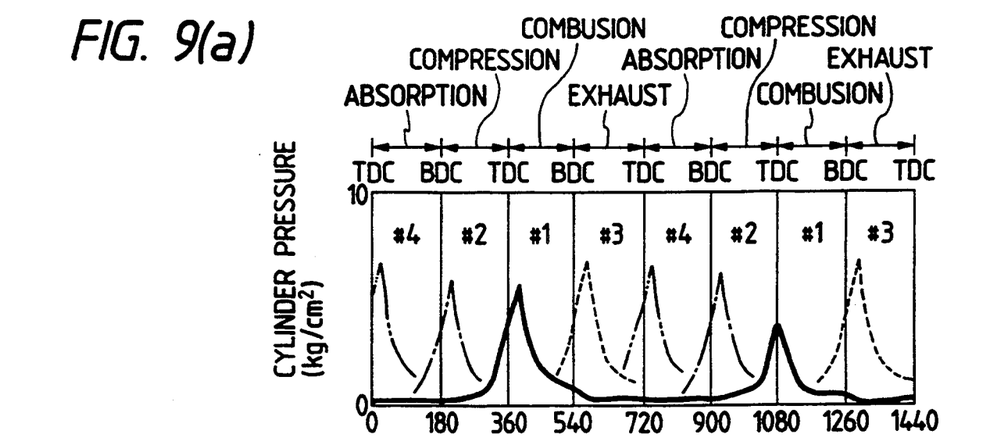
FIGS. 9(a) to 9(d) are time charts for a description of the detection of a misfire from the acceleration in the misfire detecting system of the invention.
Figure 9B:
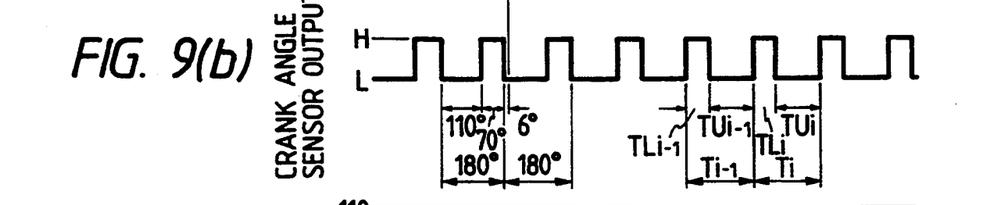
Figure 9C:
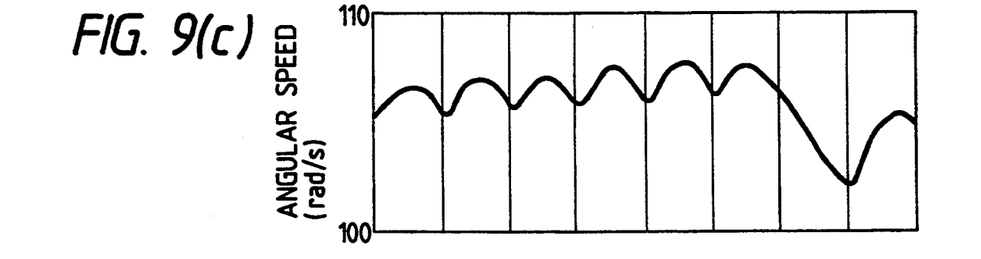
Figure 9D:
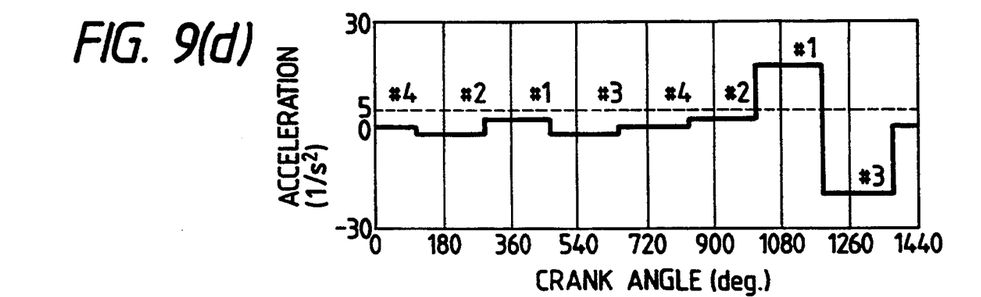

As was described before, the time chart of FIG. 7 is to describe arithmetic operations with respect to crank angles, the flow charts of FIGS. 8 and 6 are for a description of the operation of the microcomputer 9, and the time chart of FIG. 9 is to show the occurrence of a misfire with the acceleration of the time ratio.

As for an interrupt processing routine every BTDC 6°, the flow chart of FIG. 6 is employed, and as for an interrupt processing routine every BTDC 76°, instead of the flow chart of FIG. 5 the flow chart of FIG. 8 is employed. In those figures, the suffix (i) indicates the present value, and (i-1), the previous value.

When, in FIG. 7, the crank angle reaches a BTDC 76°, the operations shown in the flow chart of FIG. 8 are carried out. In FIG. 8, Steps S71 and S72 are equal to Steps S51 and S52 in FIG. 5. Since the present processing operation is for the first time after the start of the program, the time at this time instant is stored in the memory MB 76, and the processing operation is ended.

When, in FIG. 7, the position of BTDC 6°, which is located immediately before the BDC, is reached, the operations shown in the flow chart of FIG. 6 are performed. That is, the time at this time instant is stored in the memory MB 6, while a period of time corresponding to an interval $TL_{i-1}$ is calculated from the above-described expression (1), and stored in the memory MTL, and the processing operation is ended. Thereafter, when the position of BTDC 76° corresponding to the ignition signal of the next cylinder is reached, the operations in the flow chart of FIG. 8 are carried out again.

In Step S71, the time at this time instant is stored in the memory MB 76. In Step S72, the result of determination is "No". Therefore, Step S73 is effected. In Step S73, a period of time corresponding to an interval $TU_{i-1}$ is calculated from the above-described expression (2), and the time ratio is calculated from the above-described expression (3). Next, in Step S74, a period of time corresponding to an interval $T_{i-1}$ is calculated from the following expression (4) by using the value stored in the memory MTL and the value TU calculated in Step S73:

$$T_i = TL + TU \quad (4)$$

Next, in Step S75, it is determined with reference to a program (not shown) whether or not the present processing operation is for the second time. For this purpose, the flag has been so set as to indicate that the present processing operation is for the second time after the start of the program. In this case, the flag is cleared, and since the result of determination is "Yes", Step S80 is effected.

In Step S80, the value $T_i$ calculated from the above-described expression (4) is stored in a memory $MT_{i-1}$ in which the previous value $T_i$ has been stored, and similarly the time ratio TU/TL calculated from the above-described expression (3) is stored in a memory $MTU_{i-1}$ in which the previous value TU/TL has been stored. Then, the processing operation is ended. When the position of BTDC 6° located immediately before the TDC in FIG. 7 is reached as the engine rotates, the operations in the flow chart of FIG. 6 are carried out. The time at this time instant is stored in the memory MB 6, and a period of time corresponding to an interval $TL_i$ in FIG. 7 is calculated from the above-described expression (1), and stored in the memory MTL.

Next, when the position of BTDC 76° corresponding to the ignition signal of the next cylinder is reached, the operations in the flow chart of FIG. 8 are carried out. This processing operation is for the third time, and therefore Steps S71, S72, S73 and S74 are effected, so that the time at the present time instant is stored in the memory MB 76, ant a period of time corresponding to the interval $TU_i$, and a period of time corresponding to the interval $T_i$ in FIG. 7 are calculated from the above-described expressions (2) and (3), respectively. Thereafter, Step S75 is effected, to determine how many times the processing operation has been carried out. Since the flag has been cleared in the second processing operation in Step S75, the result of determination is "No". Therefore, Step S76 is effected. In Step S76, the acceleration is calculated from the following expression (5) by using the above-described stored values and calculated values:

$$\text{Acceleration} = TL_i/(T_{i-1})^3 \times [TU_i/TL_i - (TU_{i-1}/TL_{i-1})] \quad (5)$$

Thereafter, in Step 77, it is determined whether or not the acceleration thus calculated is larger than a predetermined value corresponding to the occurrence of a misfire. When it is larger, Step S78 is effected, so that the occurrence of a misfire is determined; and when it is smaller, then Step S79 is effected, so that it is determined that the engine is in normal state. Next, Step S80 is effected. In Step S80, in order to be ready for the fourth processing operation and so forth, the values $T_i$ and TU/TL of this time are stored in the memories $T_{i-1}$ and $MTU_{i-1}/TL_{i-1}$, respectively. Then, the processing operation is ended.

Similarly, when the BTDC 76° is reached, the processing operation is carried out according to the flow chart of FIG. 8; and when the BTDC 6° is reached, the processing operation is performed according to the flow chart of FIG. 6, so that the acceleration is calculated for each of the cylinders.

Now, the acceleration in the invention will be described.

In the reciprocating circular motion of the engine, the angular acceleration $\alpha$ (rad/s²) is calculated from the following expression (6):

$$\alpha = (\omega_i - \omega_{i-1})/T_i \quad (6)$$

where $\omega_i$ is the angular speed in a period of time $T_i$, and $T_i$ is the period of ignition.

The angular speed $\omega_i$ is as follows:

$$\omega_i = 4\pi/c \times (1/T_i) \quad (7)$$

where c is the number of cylinders.

From the above-described expressions (6) and (7), $$\alpha = 4\pi/c \times (1/T_i) \times \{T_i/T_i^2 - [T_{i-1}/(T_{i-1})^2]\} \quad (8)$$

When $T_{i-1} = T_i + \Delta T_i$, and $\Delta T_i^2 < 1$, then in approximation the following expression (9) is established:

$$\alpha = 4\pi/c \times (T_i - T_{i-1})/T_i^3 \quad (9)$$

The relation between the data $T_i$ and the time ratio TU/TL is Ti=TU+TL. The term TL is the data on the quantity of charged air in the stroke of compression, and it means normalization of the value TU by a reference quantity of air. If it is assumed that adjacent cylinders are constant in the quantity of charged air, then $TL_i = TL_{i-1}$. From $\Delta T_i = T_{i-1} - T_i = TU_{i-1} - TU_i$, the following expression (10) is obtained:

$$\alpha = 4\pi/c \times (TL_i/T_i^3) \times [TU_i/TL_i - (TU_{i-1}/TL_{i-1})] \quad (10)$$

In the invention, the term $4\pi/c$ is eliminated, and the following approximate expression (11) is employed for the angular speed: That is, the acceleration (1/s²) is as follows:

$$\text{Acceleration} = TL_i/(T_{i-1})^3 \times [TU_i/TL_i - (TU_{i-1}/TL_{i-1})] \quad (11)$$

Thus, the variation in angular speed which is due to the occurrence of a misfire is detected as acceleration.

FIG. 9 is a time chart for a description of the operation of determining the occurrence of a misfire from the acceleration. The contents of FIGS. 9(a), 9(b) and 9(c) are equal to those of FIGS. 3(a), 3(b) and 3(c), which have been used for a description of the detection of a misfire from the time ratio, except that symbols for acceleration are additionally used. FIG. 9(d) shows the relationships between the occurrence of misfires and the values of acceleration (1/s²). In FIG. 9(d), the solid line indicates the values of acceleration calculated for the #1 through #4 cylinders. If the value of "5" (1/s²) indicated by the broken line in the part (e) of FIG. 9 is set as the misfire deciding value in Step S77 of FIG. 8, then the occurrence of a misfire with the #1 cylinder which is around a crank angle of 1080° can be detected from the acceleration.

Now, calculation of the acceleration by the microcomputer 9 (FIG. 2) will be described.

In the embodiment, as was described before, the acceleration is calculated according to the above-described expression (11). In this operation, the acceleration is calculated with an interrupt taken place in synchronization with the output signal of the crank angle sensor, and the processing time should be shortened. For this purpose, the crank angle period (TL, TU, or T) is set to 2 bytes (or 16 bits).

And the resolution of detecting the time corresponding to the angular interval is made variable depending on the number of revolutions per minute of the engine (or engine speed). That is, when the engine speed is high and the crank angle period is short, the resolution is decreased (0.6 μs); and when the engine speed is low and the crank angle period is long, the resolution is increased (1.0 μs, 2.0 μs, . . . ), thus being of 2 bytes or less. By adjusting the time detecting resolution according to the engine speed in the above-described manner, the crank angle period can be of 2 bytes or less with respect to all the engine speeds. Thus, the processing operation can be achieved quickly and the occurrence of a misfire can be detected with high accuracy even when the engine speed is high.

Figure 10:
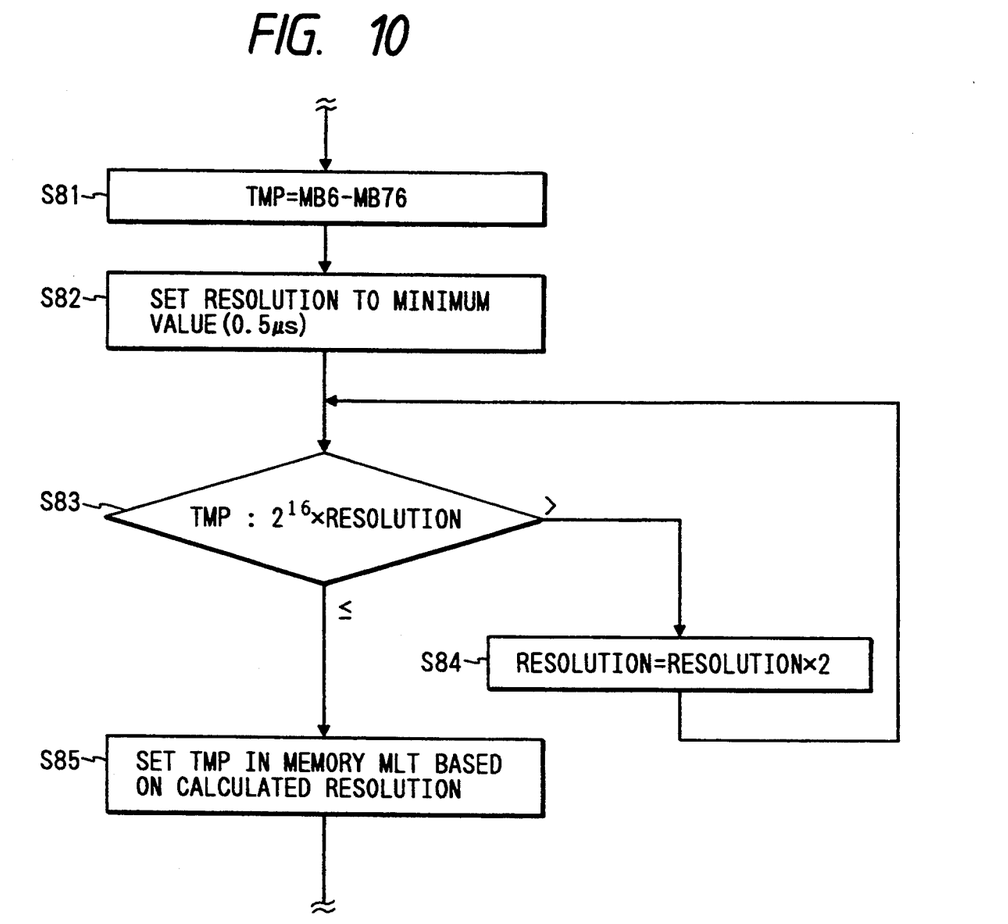
FIG. 10 is a flow chart for a description of one example of the calculation of a time detecting resolution in the misfire detecting system of the invention.

One example of the calculation of the time detecting resolution will be described with reference to a flow chart of FIG. 10. FIG. 10 shows the contents of Step S62 in FIG. 6 in more detail. First, in Step S81, a crank angle period is obtained from the counter value MB 6 and MB 76, and stored in the memory TMP. In Step S82, the resolution is set to a minimum value (0.5 μs). Thereafter, in Step S83, the content of the memory TMP is compared with the maximum value ($2^{16} \times$ resolution) of 2 bytes. When the content of the memory TMP is larger, Step S84 is effected, in which the resolution is doubled (to 1.0 μs), and Step S83 is effected again. When the content of the memory TMP is smaller, Step S85 is effected. In Step S85, the resolution of TL is determined according to the resolution thus calculated, and the value of the memory TMP is set in the memory MTL.

By setting the crank angle period within 2 bytes in the above-described manner, the program in the arithmetic section can be shortened and simplified, and accordingly the processing time can be reduced. Furthermore, when the engine speed is high, and the crank angle period is short, the resolution is decreased, as a result of which the detecting accuracy is maintained high, and the amount of load to be processed by the microcomputer can be reduced. Hence, the misfire detecting system of the invention is suitable for the case where the engine controlling operation and the misfire detecting operation are carried out with only one microcomputer. Therefore, with the misfire detecting system of the invention, the occurrence of a misfire can be detected with high accuracy. In addition, since the time ratio is obtained by dividing with the time in the stroke of compression, the variation in load of the engine can be normalized.

In the above-described embodiments, the misfire deciding value is fixed. However, it may be the average value of the time ratios or of the values of acceleration which have been detected a predetermined number of times before, or a value obtained by other averaging methods, or a value obtained through statistic operation. In addition, the misfire deciding value of each of the cylinders may be stored, so that when misfires occur a predetermined number of times it is displayed, or the rate of occurrence of misfires in a predetermined period of time is calculated so as to be displayed. Moreover, the system may be so designed that a cylinder or cylinders suffering from misfires are determined and identified.

While the embodiments have been described with reference to the 4-cylinder engine, it goes without saying that the technical concept of the invention is applicable to an engine having a single cylinder or other engines having a plurality of cylinders.

As was described above, the misfire detecting system of the invention comprises: the time ratio detecting means for detecting the time ratio of the periods of time corresponding to predetermined angular intervals which are provided before and after the predetermined crank angle of the internal combustion engine; and the misfire deciding means for obtaining the acceleration of the time ratio, to determine from the acceleration or time ratio whether or not a misfire has occurred. In the system, the resolution of detecting the periods of time corresponding to the predetermined angular intervals is changed according to the number of revolutions per minute of the engine, so that the misfire detecting speed is increased with the detecting accuracy maintained high, and the load to be processed by the microcomputer is reduced.

While there has been described in connection with the preferred embodiments of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A misfire detecting system for an internal combustion engine, comprising:
    means for outputting a reference period signal representive of a crank angle position corresponding to the timing of ignition of said internal combustion engine;
    time ratio detecting means for detecting the ratio of periods of time corresponding to predetermined angular intervals which are provided before and after a particular reference angle of said reference period signal output from outputting means;
    misfire deciding means for comparing said ratio of periods of time with a predetermined value, and for determining that a misfire has occured when said ratio of period of time is larger than said predetermined value, and that no misfire has occurs when said ratio of period of time is not larger than said predetermined value; and
    means for changing the resolution of detecting the time corresponding to said predetermined angular intervals, according to the number of revolutions per minute of said engine.

2. A misfire detecting system as claimed in claim 1, wherein said misfire deciding means obtains one of an acceleration value, determined from said periods of time corresponding to predetermined angular intervals, and said time ratio for determining whether a misfire has occurred according to the comparison result of said one of said acceleration value and said time ratio with said predetermined value.

3. A misfire detecting system as claimed in claim 1, wherein said predetermined value is of a fixed value.

4. A misfire detecting system as claimed in claim 1, wherein said predetermined value is an average value of said time ratios which have been detected a predetermined number of times before.

* * * * *